US010393239B2

(12) United States Patent
Morimoto

(10) Patent No.: US 10,393,239 B2
(45) Date of Patent: Aug. 27, 2019

(54) HYDRAULIC AUTO TENSIONER

(71) Applicant: NTN CORPORATION, Osaka (JP)

(72) Inventor: Hiroo Morimoto, Shizuoka (JP)

(73) Assignee: NTN Corporation, Osaka (JP)

(*) Notice: Subject to any disclaimer, the term of this patent is extended or adjusted under 35 U.S.C. 154(b) by 133 days.

(21) Appl. No.: 15/556,810

(22) PCT Filed: Mar. 8, 2016

(86) PCT No.: PCT/JP2016/057183
§ 371 (c)(1),
(2) Date: Nov. 28, 2017

(87) PCT Pub. No.: WO2016/143788
PCT Pub. Date: Sep. 15, 2016

(65) Prior Publication Data
US 2018/0066734 A1    Mar. 8, 2018

(30) Foreign Application Priority Data

Mar. 11, 2015   (JP) .................................. 2015-048141

(51) Int. Cl.
*F16H 7/12*    (2006.01)
*F16H 7/08*    (2006.01)

(52) U.S. Cl.
CPC ......... *F16H 7/1236* (2013.01); *F16H 7/0836* (2013.01); *F16H 7/0848* (2013.01);
(Continued)

(58) Field of Classification Search
CPC . F16H 7/1236; F16H 7/12; F16H 7/08; F16H 7/0836; F16H 7/0848;
(Continued)

(56) References Cited

U.S. PATENT DOCUMENTS 6,193,623 B1    2/2001  Koch et al.
2009/0298628 A1* 12/2009  Kawahara ............. F16H 7/1236
474/110
(Continued)

FOREIGN PATENT DOCUMENTS

JP    2009-275757    11/2009
JP    2013-151974    8/2013
(Continued)

OTHER PUBLICATIONS

Extended European Search Report dated Nov. 14, 2018 in European Application No. 16761756.2.
(Continued)

*Primary Examiner* — Michael R Mansen
*Assistant Examiner* — Robert T Reese
(74) *Attorney, Agent, or Firm* — Wenderoth, Lind & Ponack, L.L.P.

(57) ABSTRACT

A hydraulic auto-tensioner includes a cylinder, a valve sleeve, a rod, a spring seat, and a plunger slidably fitted on the outer diameter surface of the rod. A first leakage gap is defined between the fitting surfaces of the plunger and the rod. A second leakage gap is defined between the fitting surfaces of the plunger and the valve sleeve such that the resistance to oil flowing in the second leakage gap is larger than the resistance to oil flowing in the first leakage gap. With the engine running normally, when the tension of the belt increases, and thus a pushing force is applied to the hydraulic auto-tensioner such that the cylinder and the spring seat are pushed toward each other, oil in a pressure chamber leaks through the first leakage gap into a reservoir chamber.

5 Claims, 7 Drawing Sheets

(52) U.S. Cl.
CPC ....... *F16H 7/12* (2013.01); *F16H 2007/0806* (2013.01); *F16H 2007/0812* (2013.01); *F16H 2007/0846* (2013.01); *F16H 2007/0859* (2013.01); *F16H 2007/0865* (2013.01); *F16H 2007/0891* (2013.01); *F16H 2007/0893* (2013.01)

(58) Field of Classification Search
CPC ..... F16H 2007/0806; F16H 2007/0812; F16H 2007/0846; F16H 2007/0859; F16H 2007/0865; F16H 2007/0891; F16H 2007/0893
See application file for complete search history.

(56) References Cited

U.S. PATENT DOCUMENTS

| | | | |
|---|---|---|---|
| 2013/0260931 A1* | 10/2013 | Sato | F16H 7/12 474/110 |
| 2014/0057748 A1 | 2/2014 | Satomura et al. | |
| 2014/0378253 A1 | 12/2014 | Tanaka et al. | |
| 2016/0230854 A1* | 8/2016 | Kitano | F16H 7/1236 |
| 2017/0045120 A1* | 2/2017 | Yokoyama | F16H 7/0829 |
| 2017/0175858 A1* | 6/2017 | Ryeland | F02B 67/06 |

FOREIGN PATENT DOCUMENTS

| | | |
|---|---|---|
| JP | 2014-101955 | 6/2014 |
| JP | 2015-31392 | 2/2015 |
| JP | 2015-40589 | 3/2015 |
| WO | 2009/101915 | 8/2009 |
| WO | 2012/019801 | 2/2012 |

OTHER PUBLICATIONS

International Search Report dated Jun. 7, 2016 in International (PCT) Application No. PCT/JP2016/057183.

English translation of International Preliminary Report on Patentability dated Sep. 12, 2017 in International (PCT) Application No. PCT/JP2016/057183.

\* cited by examiner

HYDRAULIC AUTO TENSIONER

TECHNICAL FIELD

The present invention relates to a hydraulic auto-tensioner used to adjust the tension of a belt for driving engine accessories, such as an alternator, a water pump, or the compressor of an air-conditioner.

BACKGROUND ART

In order to reduce the emission amount of carbon dioxide, an engine is proposed which includes an idling stop mechanism of an integrated starter generator (ISG) configured to stop the engine when the vehicle stops, and to start the engine quickly when the accelerator pedal is pushed so that the vehicle starts to move.

FIGS. 7A and 7B illustrate a belt transmission device of an engine including an idling stop mechanism of an ISG capable of driving engine accessories and starting the engine. The belt transmission device further includes a crankshaft pulley $P_1$ attached to a crankshaft 51, a starter generator pulley $P_2$ attached to the rotary shaft of the starter generator 52 of the ISG, an engine accessory pulley $P_3$ attached to the rotary shaft of an engine accessory 53 such as a water pump, and a belt 54 trained around the pulleys $P_1$, $P_2$ and $P_3$. While the engine is running normally, as illustrated in FIG. 7A, the crankshaft pulley $P_1$ rotates in the direction of the shown arrow so as to drive the starter generator 52 and the engine accessory 53, thereby enabling the starter generator 52 to function as a generator.

On the other hand, when the engine is started by driving the starter generator 52, as illustrated in FIG. 7B, the starter generator pulley $P_2$ rotates in the direction of the shown arrow so as to rotate the crankshaft pulley $P_1$, thereby enabling the starter generator 52 to function as a starter.

Such a belt transmission device as described above further includes a tension pulley 55 mounted to the belt portion 54a of the belt 54 located between the crankshaft pulley $P_1$ and the starter generator pulley $P_2$, a pivotable pulley arm 56 rotatably supporting the tension pulley 55, and a hydraulic auto-tensioner A, by applying an adjustment force to the pulley arm 56, biasing the pulley arm 56 in the direction in which the tension pulley 55 presses the belt 54, thereby absorbing the tension fluctuations of the belt 54.

Japanese Unexamined Patent Application Publication No. 2009-275757 (JP 2009-275757) discloses such a hydraulic auto-tensioner as the hydraulic auto-tensioner A. The hydraulic auto-tensioner of JP 2009-275757 includes a cylinder, a valve sleeve standing on the bottom surface of the cylinder, a rod having a lower end portion slidably inserted in the valve sleeve such that a pressure chamber is defined in the valve sleeve, a spring seat provided on the top end of the rod, and a return spring mounted between the spring seat and the bottom surface of the cylinder so as to bias the rod and the valve sleeve in the direction in which the rod protrudes from the valve sleeve.

Also, in the hydraulic auto-tensioner of JP 2009-275757, a sealed reservoir chamber is defined between the inner periphery of the cylinder and the outer periphery of the valve sleeve, an oil passage is formed in the bottom of the cylinder such that the lower portion of the pressure chamber communicates with the lower portion of the reservoir chamber through the oil passage, and a check valve is provided in the bottom end of the valve sleeve. The check valve is configured such that when a pushing force is applied to the rod so that the pressure in the pressure chamber exceeds the pressure in the reservoir chamber, the check valve is closed so as to block the communication between the pressure chamber and the oil passage.

The hydraulic auto-tensioner described above is configured such that a coupling piece provided on the top surface of the spring seat is rotatably coupled to the engine block E illustrated in FIG. 7A. A coupling piece provided on the bottom surface of the cylinder is coupled to the pulley arm 56, and the check valve is closed when a pushing force is applied to the rod from the belt 54 through the tension pulley 55 and the pulley arm 56. Oil in the pressure chamber flows through a leakage gap defined between the sliding surfaces of the valve sleeve and the rod, the viscous resistance of the oil flowing in the leakage gap generates a hydraulic damper force in the pressure chamber, and this hydraulic damper force dampens the above pushing force.

Since the above conventional hydraulic auto-tensioner is configured such that when a pushing force is applied to the rod, oil in the pressure chamber leaks through the single leakage gap, defined between the sliding surfaces of the valve sleeve and the rod, it is impossible to apply an appropriate tension to the belt 54 both while the engine is running normally and when the engine is started by driving the starter generator 52.

Namely, if the size of the leakage gap is set such that the tension fluctuations of the belt 54 can be absorbed while the engine is running normally, the leakage gap becomes large. As a result thereof, when the engine is started by driving the starter generator 52, the rod is pushed into the pressure chamber to a large degree, so that the belt 54 loosens, thereby generating slippage at the contact portions of the belt 54 and each pulley $P_1$, $P_2$, $P_3$. This may shorten the service life of the belt, and cause the engine to malfunction when started by the starter generator 52.

On the other hand, if the size of the leakage gap is set such that the tension fluctuations of the belt 54 can be absorbed when the engine is started by driving the starter generator 52, the leakage gap becomes small. As a result thereof, while the engine is running normally, the tension of the belt 54 becomes too high or extremely strong. This is likely to damage the belt 54 or the bearing rotatably supporting each pulley $P_1$, $P_2$, $P_3$, thus increasing fuel consumption.

It is an object of the present invention to provide a hydraulic auto-tensioner capable of applying an appropriate tension to the belt both while the engine is running normally and when the engine is started by driving the starter generator.

SUMMARY OF THE INVENTION

In order to achieve the above object, the present invention provides a hydraulic auto-tensioner comprising: a cylinder having a bottom, and containing oil in the cylinder; a valve sleeve standing on a bottom surface of the cylinder; a rod having a lower end portion slidably inserted in the valve sleeve such that a pressure chamber is defined in the valve sleeve; a spring seat provided on an upper portion of the rod; and a return spring mounted between the spring seat and the bottom surface of the cylinder, and biasing the cylinder and the spring seat in a direction away from each other. A reservoir chamber is defined between an inner periphery of the cylinder and an outer periphery of the valve sleeve, and an oil passage is formed such that a lower portion of the pressure chamber communicates with a lower portion of the reservoir chamber through the oil passage. A first check valve is provided in a bottom end of the valve sleeve, and is configured such that when pressure in the pressure chamber exceeds pressure in the reservoir chamber, the first check valve is closed so as to block communication between the pressure chamber and the oil passage.

The hydraulic auto-tensioner is configured such that when a pushing force is applied to the rod through the spring seat, the first check valve is closed so that oil in the pressure chamber leaks from the pressure chamber into the reservoir chamber, and a hydraulic damper force generated by the oil leaking from the pressure chamber dampens the pushing force applied to the rod. The hydraulic auto-tensioner further comprises: a tubular plunger fitted on an outer diameter surface of the rod, wherein a first leakage gap is defined between sliding surfaces of the plunger and the rod, the tubular plunger being slidable along the outer diameter surface of the rod and the an inner diameter surface the valve sleeve. A second leakage gap is defined between sliding surfaces of the plunger and the valve sleeve such that resistance to oil flowing in the second leakage gap is larger than resistance to oil flowing in the first leakage gap, a second check valve provided between the rod and the plunger, and configured to close the first leakage gap when the plunger moves upwardly as the pressure in the pressure chamber increases; a stopper is provided at a bottom end of the rod so as to prevent separation of the plunger; and a valve spring biases the plunger toward the stopper.

In order to enable the hydraulic auto-tensioner configured as described above to adjust the tension of the belt of a belt transmission device for driving engine accessories including an idling stop mechanism of an ISG, the spring seat at the distal end of the rod is coupled to a component, such as an engine block, and the bottom end of the cylinder is coupled to a pulley arm. In this state, the hydraulic auto-tensioner biases the pulley arm in the direction in which a tension pulley supported by the pulley arm presses the portion of the belt between a crankshaft pulley and a starter generator pulley, thereby making the belt tense.

With the hydraulic auto-tensioner mounted to the belt transmission device as described above, when the tension of the belt increases in the state in which the engine is running normally, and thus a pushing force is applied to the rod from the belt, the pressure in the pressure chamber increases, and the first check valve is closed. Therefore, oil in the pressure chamber leaks into the reservoir chamber through the first leakage gap, in which the resistance to flowing oil is smaller, and the viscous resistance of the oil flowing in the first leakage gap generates a hydraulic damper force in the pressure chamber. This hydraulic damper force dampens the above pushing force, so that the tension of the belt is maintained within an appropriate range.

On the other hand, when the engine is started by driving the starter generator, the tension of the belt increases rapidly, so that the pressure in the pressure chamber increases rapidly. At this time, the first check valve is closed. Thereafter, the plunger moves upwardly until the second check vale is closed, so that the first leakage gap is closed.

In the above state, oil in the pressure chamber leaks through the second leakage gap into the reservoir chamber. Since the resistance to oil flowing in the second leakage gap is larger than the resistance to oil flowing in the first leakage gap, the pressure in the pressure chamber decrease to a small degree, and the hydraulic damper force in the pressure chamber restricts the retraction of the rod. As a result thereof, the tension of the belt is maintained within a range necessary for driving the crankshaft, thereby preventing the slippage between the belt and each pulley.

The hydraulic auto-tensioner may be configured such that the rod includes, at the upper portion of the rod, a large diameter shaft portion extending from near a top end of the plunger toward an outside of the plunger, and the second check valve comprises: a valve seat having a spherical surface, and provided at a bottom end of the large diameter shaft portion of the rod; and a seat surface provided on an upper portion of an inner diameter surface of the plunger, and capable of being seated on the valve seat.

In engines including an idling stop mechanism, idling stop tends to be performed frequently for the purpose of reducing fuel consumption. In this case, every time the starter generator is driven, the plunger moves upwardly, and the seat surface collides hard against the valve seat. Therefore, it is preferable that both the valve seat of the rod and the seat surface of the plunger are subjected to surface hardening treatment so as to increase their strength and thus ensure the high durability thereof As the above surface hardening treatment, diamond-like carbon treatment (DLC treatment), hard film forming coating treatment, shot peening, or WPC treatment may be used.

As the valve spring, which biases the plunger toward the stopper at the bottom end of the rod, a coil spring, a plurality of disk springs, a plurality of wave washers, or a wave spring may be used in the hydraulic auto-tensioner of the present invention.

Effects of the Invention

According to the present invention, since, as described above, while the engine is running normally, oil in the pressure chamber leaks into the reservoir chamber through the first leakage gap, in which the resistance to flowing oil is smaller, whereas when the engine is started by driving the starter generator, oil in the pressure chamber leaks into the reservoir chamber through the second leakage gap, in which the resistance to flowing oil is larger, it is possible to apply an appropriate tension to the belt both while the engine is running normally and when the engine is started by driving the starter generator.

DETAILED DESCRIPTION OF THE INVENTION

Figure 1:
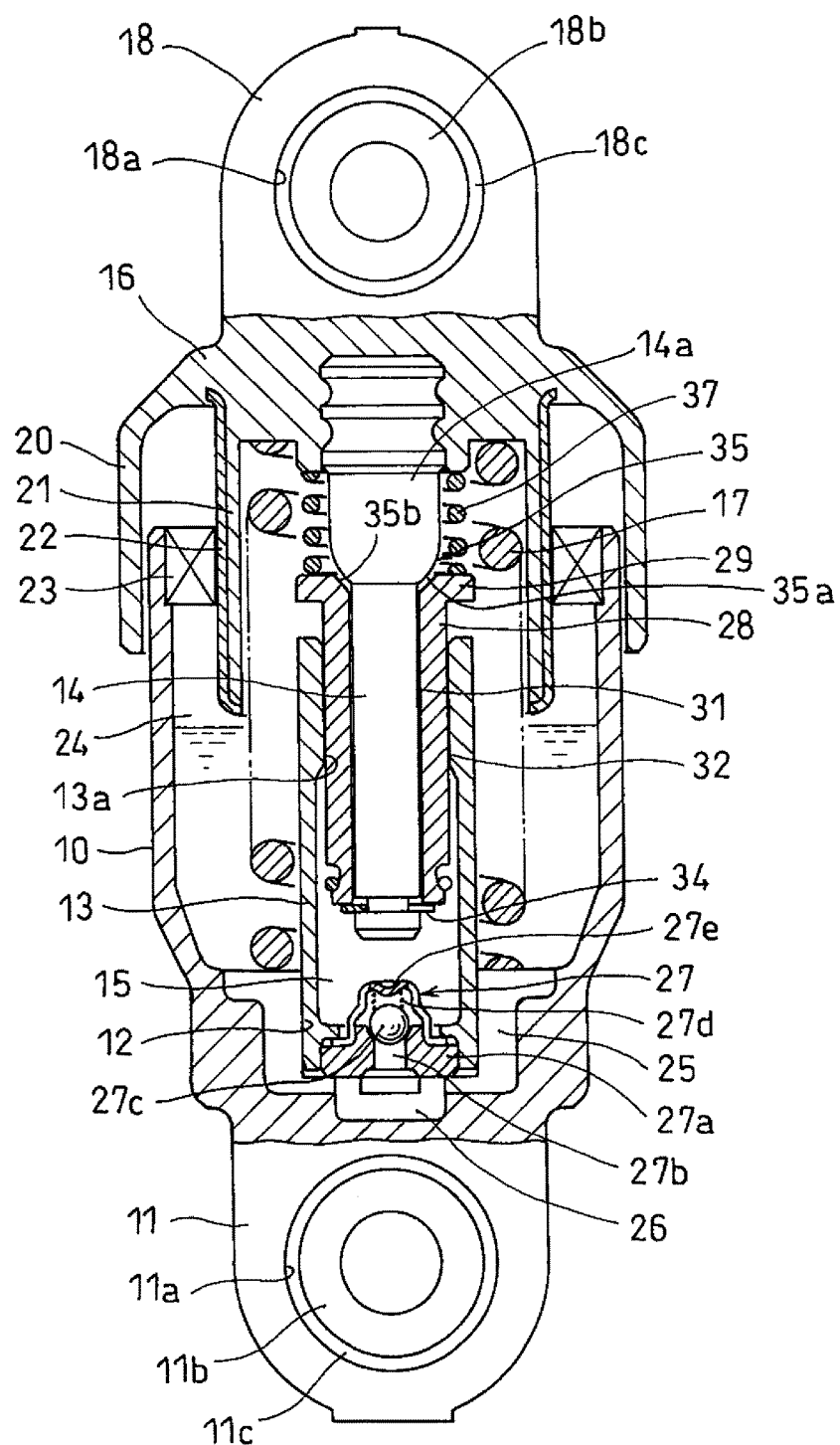
FIG. 1 is a vertical sectional view of a hydraulic auto-tensioner embodying the present invention.

A hydraulic auto-tensioner embodying the present invention is now described with reference to the drawings. As illustrated in FIG. 1, the hydraulic auto-tensioner includes a cylinder 10 having a bottom, and a coupling piece 11 provided on the undersurface of the bottom of the cylinder 10 and coupled to the pulley arm 56 of FIGS. 7A and 7B.

The coupling piece 11 has a shaft inserting hole 11a extending through the coupling piece 11 from one to the other side surface of the coupling piece 11. A tubular fulcrum shaft 11b and a sliding bearing 11c rotatably supporting the fulcrum shaft 11b are mounted in the shaft inserting hole 11a of the coupling piece 11. The fulcrum shaft 11b is fixed in position by tightening a bolt inserted through the fulcrum shaft 11b and threadedly engaged with the pulley arm 56, so that the coupling piece 11 is pivotally attached to the pulley arm 56.

The auto-tensioner further includes a valve sleeve 13 made of steel and having a bottom end portion press-fitted in a valve sleeve fitting hole 12 in the inner bottom surface of the cylinder 10; and a rod 14 having a lower portion slidably inserted in the valve sleeve 13 such that a pressure chamber 15 is defined under the rod 14 in the valve sleeve 13.

A spring seat 16 is provided on the top end portion of the rod 14 that is located outside of the cylinder 10. A return spring 17 is mounted between the spring seat 16 and the inner bottom surface of the cylinder 10, and biases the cylinder 10 and the rod 14 in the direction in which the rod 14 protrudes from the cylinder 10.

A coupling piece 18 configured to be coupled to an engine block is provided on the top end of the spring seat 16. The coupling piece 18 is formed with a sleeve inserting hole 18a extending through the coupling piece 18 from one to the other side surface of the coupling piece 18. A sleeve 18b and a sliding bearing 18c rotatably supporting the sleeve 18b are mounted in the sleeve inserting hole 18a of the coupling piece 18. The coupling piece 18 is pivotally coupled to the engine block by a bolt inserted through the sleeve 18b.

A tubular dust cover 20 covering the outer periphery of the upper portion of the cylinder 10, and a tubular spring cover 21 covering the upper portion of the return spring 17 are formed at the same time as the spring seat 16 is formed.

The spring seat 16 may be formed of aluminum by die casting, or formed of a resin, such as a thermosetting resin.

The entire outer periphery of the spring cover 21 is covered by a tubular member 22 formed by pressing a steel plate. The spring seat 16 is formed by molding in a mold with the tubular member 22 inserted in the mold.

An oil seal 23 is provided as a seal member in the top opening of the cylinder 10 such that the inner periphery of the oil seal 23 is in elastic contact with the outer peripheral surface of the tubular member 22. The oil seal 23 thus closes the top opening of the cylinder 10, preventing leakage of oil in the cylinder 10, and entry of dust into the cylinder 10.

The oil seal 23 defines a closed reservoir chamber 24 between the cylinder 10 and the valve sleeve 13. The reservoir chamber 24 and the pressure chamber 15 communicate with each other through oil passages 25 formed between the fitting surfaces of the valve sleeve fitting hole 12 and the valve sleeve 13, and through an oil reservoir 26 comprising a circular recess formed in the center of the bottom surface of the valve sleeve fitting hole 12.

A first check valve 27 is mounted in the bottom end of the valve sleeve 13. The first check valve 27 includes a valve seat 27a having a valve hole 27b and press-fitted in the bottom end of the valve sleeve 13; a check ball 27c made of steel and configured to open and close the valve hole 27b of the valve seat 27a from/on the side of the pressure chamber 15; a spring 27d biasing the check ball 27c toward the valve hole 27b; and a retainer 27e restricting the stroke/movement of the check ball 27c, thereby restricting the degree of opening of the first check valve 27.

The first check valve 27 is configured such that when the pressure in the pressure chamber 15 exceeds the pressure in the reservoir chamber 24, the check ball 27c closes the valve hole 27b so as to block the communication between the pressure chamber 15 and the oil passages 25, thereby preventing oil in the pressure chamber 15 from flowing into the reservoir chamber 24 through the oil passages 25.

Figure 2A:
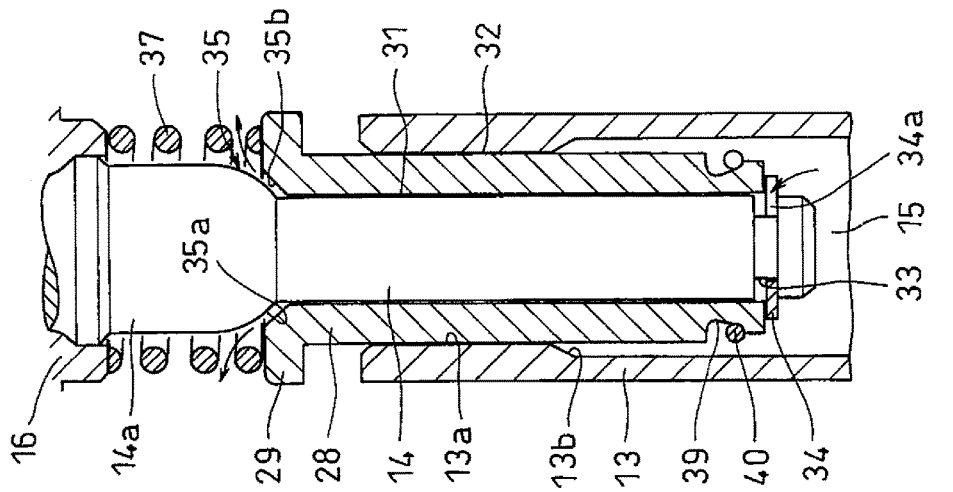
FIG. 2A is an enlarged sectional view illustrating the portion of the hydraulic auto-tensioner in which the first and second leakage gaps of FIG. 1 are defined, and how oil leaks through the first leakage gap.
Figure 2B:
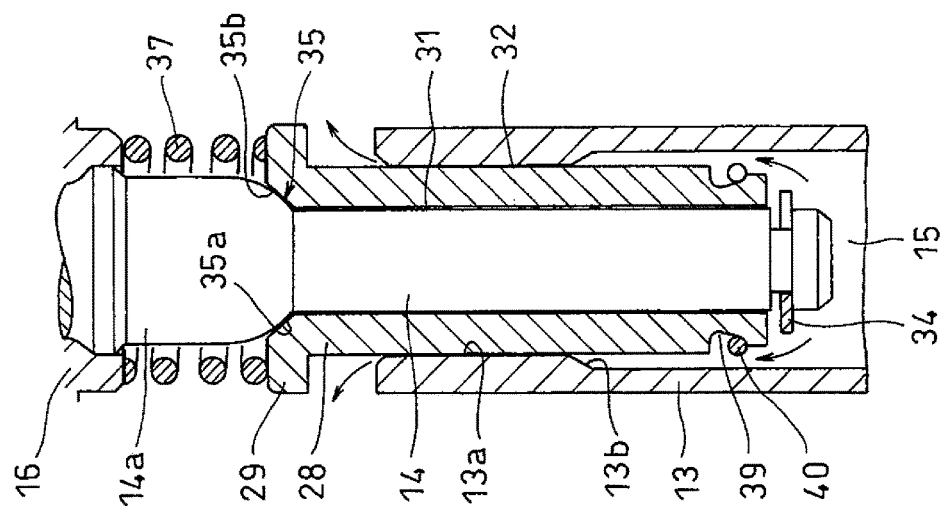
FIG. 2B is an enlarged sectional view illustrating the portion of the hydraulic auto-tensioner in which the first and second leakage gaps of FIG. 1 are defined, and how oil leaks through the second leakage gap.

As illustrated in FIGS. 1, 2A, and 2B, a tubular plunger 28 is fitted on the rod 14 so as to be slidable along the radially outer surface of the rod 14 and a small-diameter, radially inner surface 13a of the valve sleeve 13 at the upper portion of the inner periphery of the valve sleeve 13. A cylindrical first leakage gap 31 is defined between the sliding surfaces of the rod 14 and the plunger 28. A cylindrical second leakage gap 32 is defined between the sliding surfaces of the plunger 28 and the valve sleeve 13.

The second leakage gap 32 is smaller in size than the first leakage gap 31. Due to this size difference between the leakage gaps 31 and 32, the resistance to oil flowing in the second leakage gap 32 is larger than the resistance to oil flowing in the first leakage gap 31.

As a result, different hydraulic damper forces are generated in the pressure chamber 15 when oil leaks through the first and second leakage gaps 31 and 32, respectively, from the pressure chamber 15, due to the different viscous resistances of oil.

Figure 7A:
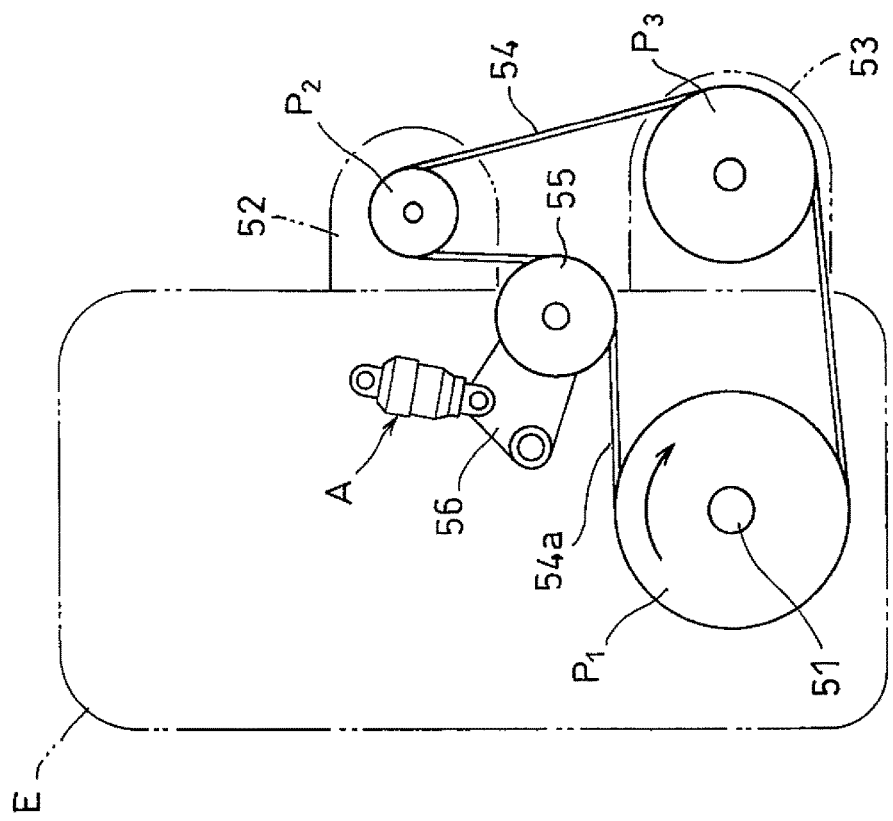
FIG. 7A is a front view of a belt transmission device of an engine including an idling stop mechanism with the engine running normally.
Figure 7B:
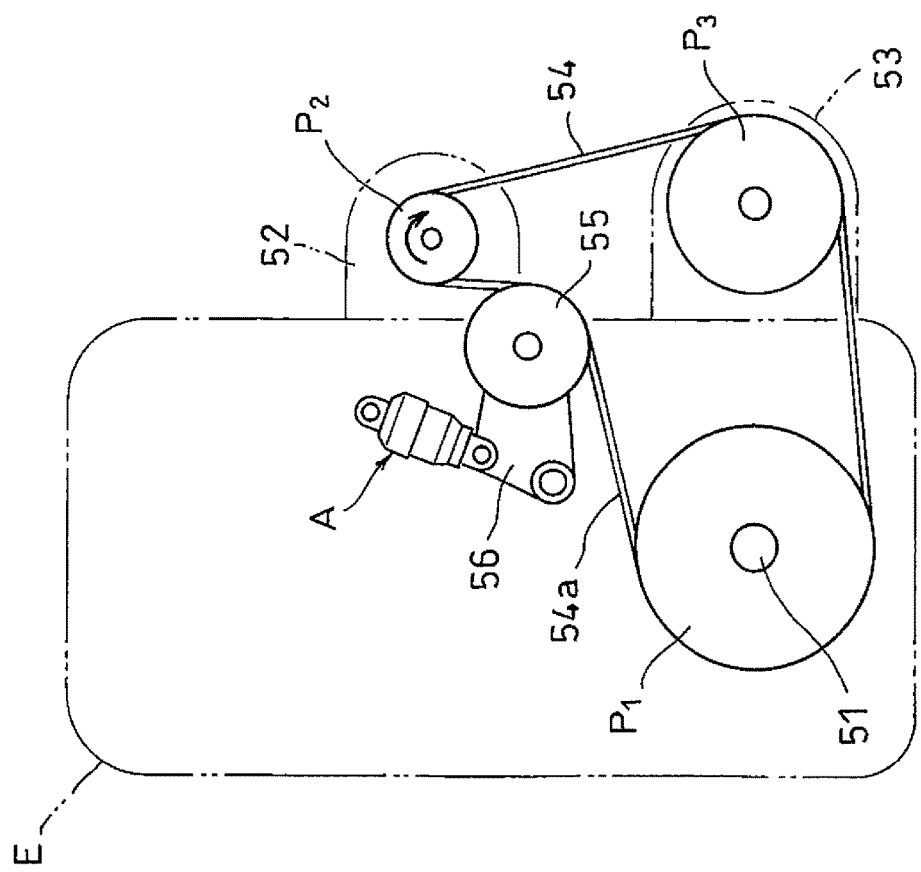
FIG. 7B is a front view of the belt transmission device of the engine including an idling stop mechanism, when the engine is started by a starter generator.

In particular, the size of the first leakage gap 31 is set such that the tension fluctuations of the belt 54 while the engine is running normally as illustrated in FIG. 7A can be absorbed by the hydraulic damper force generated due to the leakage of oil through the first leakage gap 31. On the other hand, the size of the second leakage gap 32 is set such that when the engine is started by driving the starter generator 52 as illustrated in FIG. 7B, the rod 14 is not pushed into the pressure chamber 15 too rapidly.

As illustrated in FIG. 2A, a stopper 34 is mounted to the bottom end of the rod 14, and prevents the separation of the plunger 28. In this embodiment, the stopper 34 comprises a snap ring fitted in a ring groove 33 formed in the bottom end of the rod 14.

The stopper 34 comprising a snap ring has circumferentially separated ends defining a gap 34a therebetween, so that the pressure chamber 15 is always in communication with the first leakage gap 31 through the gap 34a.

A second check valve 35 is provided between the rod 14 and the plunger 28, and is configured to close the first leakage gap 31 when the engine is started by driving the starter generator 52, and the pressure in the pressure chamber 15 increases.

The rod 14 includes, at its upper portion, a large diameter shaft portion 14a extending from near the top end of the plunger 28 toward the outside of the plunger 28. The second check valve 35 comprises a valve seat 35a having a spherical surface and provided at the bottom end of the large diameter shaft portion 14a of the rod 14, and a seat surface 35b formed at the upper portion of the radially inner surface of the plunger 28. The second check valve 35 is configured to close the top end opening of the first leakage gap 31 by seating the seat surface 35b on the valve seat 35a when the plunger 28 moves upwardly under the pressure in the pressure chamber 15.

The seat surface 35b comprises a tapered surface in this embodiment, but may comprise a surface other than a tapered surface, such as a convex spherical surface.

While the second check valve 35 is provided near the top end of the plunger 28 in this embodiment, the second check valve 35 may be provided inside, or near the bottom end, of the plunger 28.

The valve seat 35a of the rod 14 and the seat surface 35b of the plunger 28 are subjected to surface hardening treatment for increased strength. As such surface hardening treatment, while DLC treatment is used in this embodiment, hard film forming coating treatment, or shot peening may be used instead of DLC treatment.

The plunger 28 includes an outwardly extending flange 29 at the upper portion of the plunger 28. A valve spring 37 is mounted between the opposed surfaces of the flange 29 and the spring seat 16, and biases the plunger 28 toward the stopper 34, attached to the bottom end of the rod 14.

Figure 3:
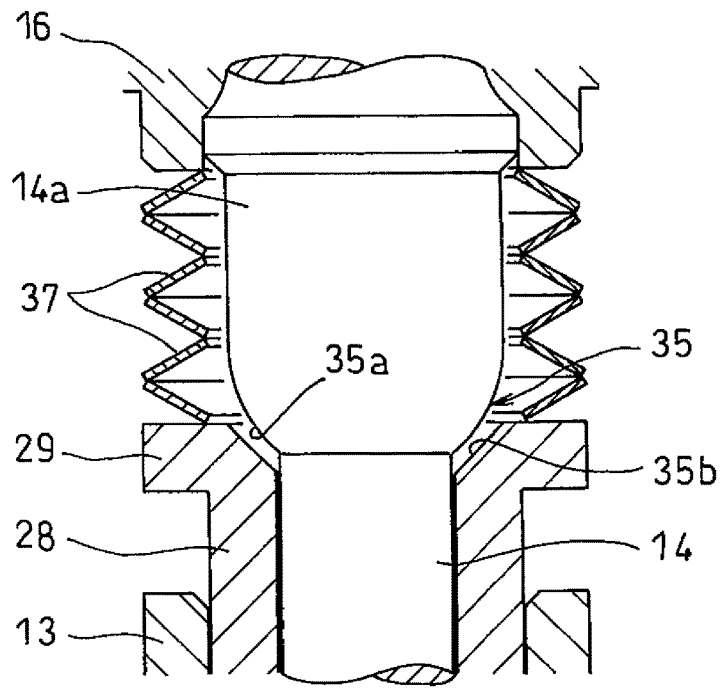
FIG. 3 is a sectional view of a different valve spring.
Figure 4:
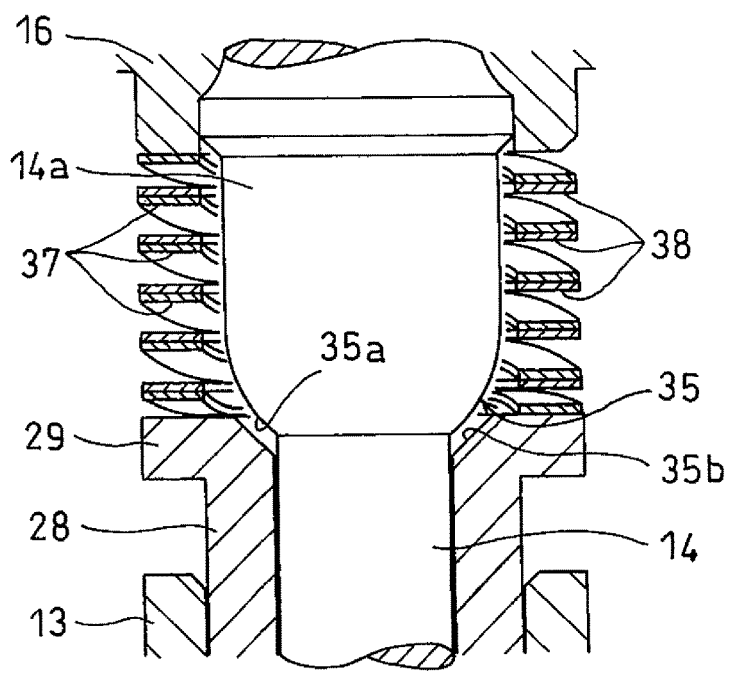
FIG. 4 is a sectional view of a still different valve spring.
Figure 5:
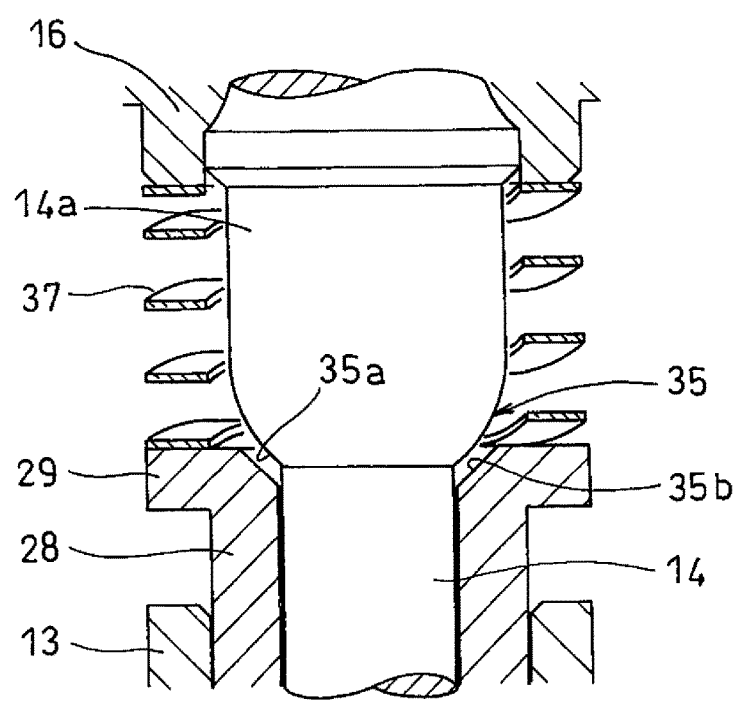
FIG. 5 is a sectional view of a yet different valve spring.

While a single valve spring 37 comprising a coil spring is used in FIG. 2A, a plurality of disk springs may be used instead as illustrated in FIG. 3. Alternatively, a plurality of wave washers 37 may be used instead as illustrated in FIG. 4. Further alternatively, a wave spring 37 may be used instead as illustrated in FIG. 5. If the wave washers 37 illustrated in FIG. 4 are used, a flat washer 38 is disposed between each adjacent pair of the wave washers 37.

As illustrated in FIG. 2A, the plunger 28 has, in the outer periphery of the lower portion thereof, a ring-shaped tapered groove 39 of which the lower portion has a larger diameter, and an anti-pullout ring 40 is fitted in the tapered groove 39. The outer diameter of the anti-pullout ring 40 in its natural state is larger than the outer diameter of the plunger 28, so that the outer peripheral portion of the anti-pullout ring 40 is located outside of the radially outer surface of the plunger 28. Due to this structure, the anti-pullout ring 40 can prevent the plunger 28 and the rod 14 from being pulled upwardly out of the top end of the valve sleeve 13 by abutting against a step 13b formed at the bottom end of the small—diameter, radially inner surface 13a, which is formed on the upper portion of the inner periphery of the valve sleeve 13.

To mount the hydraulic auto-tensioner of the embodiment configured as described above to the belt transmission device for driving the engine accessory 53 illustrated in FIGS. 7A and 7B, which includes an idling stop mechanism, the coupling piece 11 on the closed end of the cylinder 10 is coupled to the pulley arm 56, and the coupling piece 18 of the spring seat 16 is coupled to the engine block so that the hydraulic auto-tensioner can apply an adjustment force to the pulley arm 56.

In the above state, in which the tension of the belt 54 is adjusted by the hydraulic auto-tensioner, with the engine running normally, when, due to e.g., fluctuations in loads applied to the engine accessory 53, the tension of the belt 54 decreases, the pushing force of the return spring 17 moves the cylinder 10 and the spring seat 16 relative to each other in the direction away from each other, thereby absorbing the looseness of the belt 54.

When the cylinder 10 and the spring seat 16 are moved relative to each other in the direction away from each other, the pressure in the pressure chamber 15 becomes lower than the pressure in the reservoir chamber 24, so that the first check valve 27 opens, and oil in the reservoir chamber 24 flows smoothly into the pressure chamber 15 through the oil passages 25 and the oil reservoir 26. This allows the cylinder 10 and the spring seat 16 to smoothly move relative to each other in the direction away from each other, thereby quickly absorbing the looseness of the belt 54.

On the other hand, when the tension of the belt 54 increases, a pushing force, i.e., the force that tends to push the cylinder 10 and the spring seat 16 toward each other, is applied from the belt 54 to the hydraulic auto-tensioner. Due to this pushing force, the pressure in the pressure chamber 15 becomes higher than the pressure in the reservoir chamber 24, thus causing the check ball 27c of the first check valve 27 to close the valve hole 27b.

In this state, as illustrated by the arrows in FIG. 2A, oil in the pressure chamber 15 flows through the first leakage gap 31, and leaks from the top end opening of the first leakage gap 31 into the reservoir chamber 24, illustrated in FIG. 1. At this time, the oil flowing in the first leakage gap 31 generates a hydraulic damper force in the pressure chamber 15. This hydraulic damper force dampens the pushing force applied to the hydraulic auto-tensioner from the belt 54.

Since the size of the first leakage gap 31 is set such that while the engine is running normally, the tension fluctuations of the belt 54 can be absorbed, the tension of the belt 54 does not become too high while the engine is running normally, and is maintained within an appropriate range.

On the other hand, when the engine is started by driving the starter generator 52, the tension of the belt 54 increases rapidly, thereby increasing the pushing force applied to the rod 14 through the spring seat 16. As a result thereof, the pressure in the pressure chamber 15 increases rapidly, thus closing the first check valve 27, so that the pressure in the pressure chamber 15 further increases. When the pressure in the pressure chamber 15 exceeds the elastic force of the valve spring 37, the plunger 28 moves upwardly against the elastic force of the valve spring 37 until the seat surface 35b of the plunger 28 is seated on the valve seat 35a of the rod 14, and the second check valve 35 is closed, as illustrated in FIG. 2B.

When the second check valve 35 is closed, the top end opening of the first leakage gap 31 is closed, so that as illustrated by the arrows in FIG. 2B, oil in the pressure chamber 15 now flows through the second leakage gap 32, and leaks from the top end opening of the second leakage gap 32 into the reservoir chamber 24.

In this state, since the resistance to oil flowing in the second leakage gap 32 is larger than the resistance to oil flowing in the first leakage gap 31, oil in the pressure chamber 15 flows slowly through the second leakage gap 32, so that the pressure in the pressure chamber 15 does not decrease rapidly, and the hydraulic damper force in the pressure chamber 15 restricts the retraction of the rod 14. As a result thereof, the tension of the belt 54 is maintained within a range necessary for driving the crankshaft 51, thereby preventing the slippage between the belt 54 and each pulley $P_1$, $P_2$, $P_3$.

Since, as described above, while the engine is running normally, oil in the pressure chamber 15 leaks into the reservoir chamber 24 through the first leakage gap 31, in which the resistance to flowing oil is smaller, whereas when the engine is started by driving the starter generator 52, oil in the pressure chamber 15 leaks into the reservoir chamber 24 through the second leakage gap 32, in which the resistance to flowing oil is larger, it is possible to apply an appropriate tension to the belt 54 both while the engine is running normally and when the engine is started by driving the starter generator 52.

Figure 6:
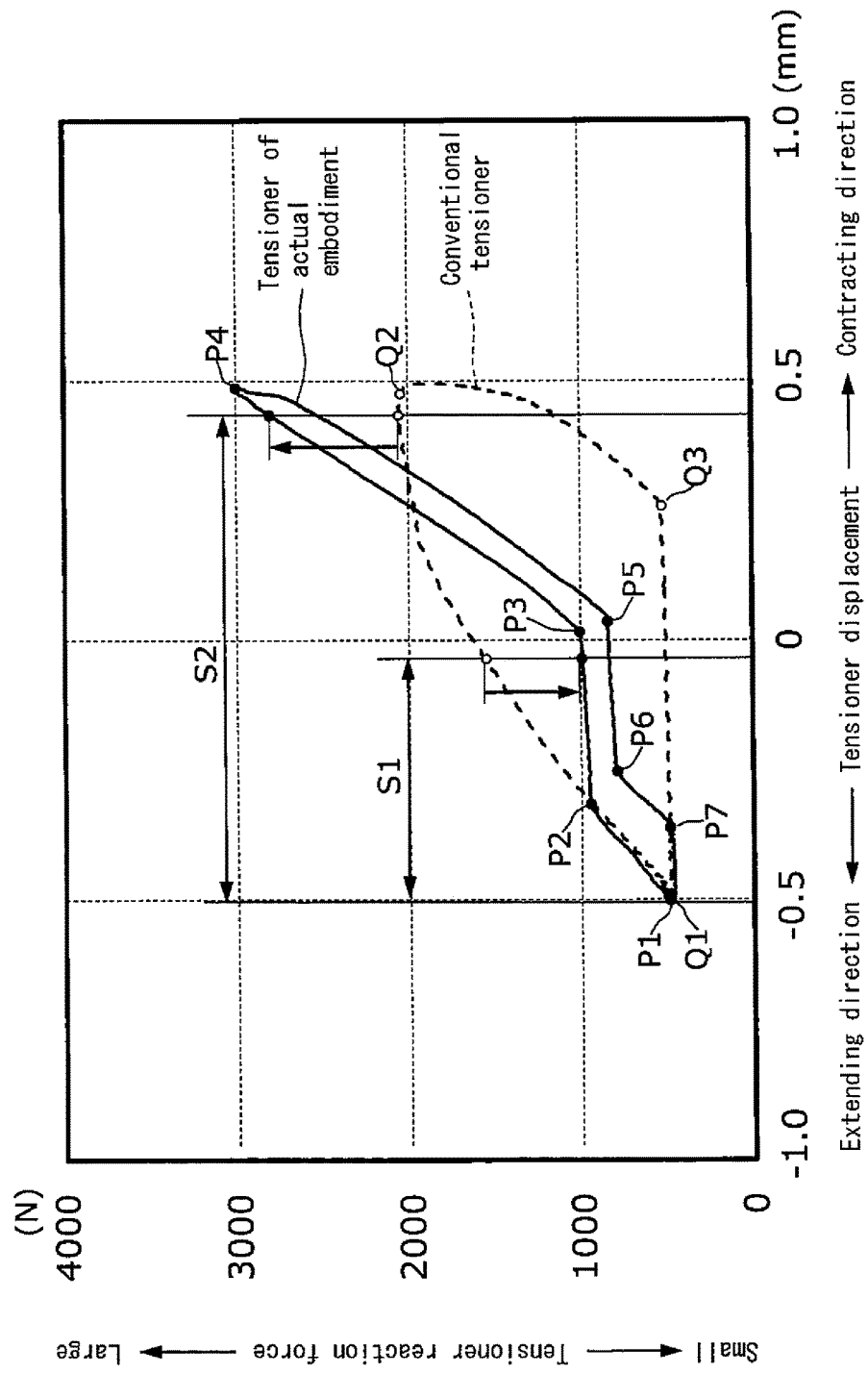
FIG. 6 is a graph illustrating a measurement result relating to the reaction force characteristics of a conventional hydraulic auto-tensioner and the hydraulic auto-tensioner embodying the present invention.

FIG. 6 illustrates a measurement result in which the reaction force characteristics of a hydraulic auto-tensioner actually manufactured according to the above embodiment (this tensioner is hereinafter referred to as "the tensioner of the actual embodiment") is compared to the reaction force characteristics of a conventional hydraulic auto-tensioner (hereinafter referred to as "the conventional tensioner").

The actual embodiment is a tensioner exactly as described in the above embodiment. In other words, the tensioner of the actual embodiment includes: as illustrated in FIGS. 1, 2A, and 2B, a tubular cylinder 10 having a bottom; a valve sleeve 13 extending upwardly from the bottom surface of the cylinder 10; a plunger 28 inserted in the valve sleeve 13 so as to be slidable in the upward and downward directions; a rod 14 inserted in the plunger 28 so as to be slidable in the upward and downward directions; a pressure chamber 15 defined by the valve sleeve 13, the rod 14, and the plunger 28; a cylindrical first leakage gap 31 defined between the sliding surfaces of the rod 14 and the plunger 28; a cylindrical second leakage gap 32 defined between the sliding surfaces of the plunger 28 and the valve sleeve 13; a spring seat 16 fixed to the top end of the rod 14; a return spring 17 biasing the spring seat 16 in the upward direction with respect to the cylinder 10; a valve spring 37 biasing the plunger 28 in the downward direction; a valve seat 35a provided as an upper stopper so as to restrict the upward movement of the plunger 28 with respect to the rod 14; and a lower stopper 34 configured to restrict the downward movement of the plunger 28 with respect to the rod 14. For this tensioner (as well as for the conventional tensioner), a change in the upward force applied to the spring seat 16 (tensioner reaction force) was measured when the spring seat 16 was vertically vibrated with the cylinder 10 fixed in position.

The conventional tensioner was a tensioner exactly as illustrated in FIG. 1 of JP 2009-275757 (i.e., a tensioner which does not includes a component corresponding to the plunger 28 of the embodying tensioner such that the rod 14 slides directly on the sleeve 13).

The vibration conditions were as follows:
Control method: displacement control
Vibration waveform: sine wave
Vibration frequency: 10 Hz The "displacement control" is a control method by which the displacement of the spring seat 16 is controlled such that irrespective of how the force applied to the spring seat 16 (tensioner reaction force) increases and decreases, the position of the spring seat 16 forms a sine wave as time passes. The vibration amplitude was set to be ±0.5 mm, which is larger than the amplitude of vibration ordinarily applied to the tensioner while the engine is running normally (e.g., about ±0.1 mm to ±0.2 mm). The tensioner of the actual embodiment and the conventional tensioner both used a return spring 17 having a spring coefficient of about 35 N/mm.

FIG. 6 illustrates the relationship between the tensioner displacement (downward displacement of the spring seat 16) and the tensioner reaction force (upward force applied to the spring seat 16) obtained by the above vibration experiment.

As illustrated in FIG. 6, while the tensioner of the actual embodiment is being contracted, the tensioner reaction force changes in three stages, i.e., "rapidly", "slowly", and "rapidly" in this order. Namely, while the tensioner of the actual embodiment is being contracted, its tensioner reaction force increases relatively rapidly in a first stage (from initial point P1, where the tensioner reaction force is minimum, to point P2); hardly increases, i.e., remains substantially unchanged, in a second stage (from point P2 to point P3); and increases relatively rapidly in a third stage (point P3 to point P4, where the tensioner reaction force is maximum).

When the tensioner of the actual embodiment is extended thereafter, the tensioner reaction force changes in four stages, i.e., "rapidly", "slowly", "rapidly", and "slowly" in this order. Namely, while the tensioner of the actual embodiment is being extended, its tensioner reaction force decreases relatively rapidly in a first stage (from point P4, where the tensioner reaction force is maximum, to point P5); hardly decreases, i.e., remains substantially unchanged, in a second stage (from point P5 to point P6); decreases relatively rapidly in a third stage (from point P6 to point P7); and hardly decreases, i.e., remains substantially unchanged, in a fourth stage (from point P7 to point P1, where the tensioner reaction force is minimum).

On the other hand, while the conventional tensioner is being contracted, the tensioner retainer force increases substantially linearly from the minimum value (point Q1) to the maximum value (point Q2). When the conventional tensioner is extended, the tensioner reaction force changes in two stages, i.e., first "rapidly" and then "slowly". Namely, while the conventional tensioner is being extended, its tensioner reaction force decreases relatively rapidly in a first stage (from initial point Q2, where the tensioner reaction force is maximum, to point Q3); and hardly decreases, i.e., remains substantially unchanged, in a second stage (from Q3 to Q1, where the tensioner reaction force is minimum.

Namely, the tensioner of the actual embodiment shows reaction force characteristics in which (i) while the tensioner is being contracted, the rate at which the tensioner reaction force is increasing changes from high to low at point P2, and then changes from low to high at point 3; and (ii) while the tensioner is being extended, the rate at which the tensioner reaction force is decreasing changes from high to low at point P5, then from low to high at point P6, and finally from high to low at point P7.

It is now described, with reference to FIGS. 1, 2A, 2B and 6, why the tensioner of the actual embodiment shows the reaction force characteristics described above.

<Points P1 to P2>

The rod 14 illustrated in FIG. 2A starts to move downwardly. At this time, since the plunger 28 is biased downwardly by the valve spring 37, and thus pressed against the stopper 34, the plunger 28 also moves downwardly together with the rod 14. When the plunger 28 and the rod 14 move downwardly together, some oil in the pressure chamber 15 flows from the pressure chamber 15 through the first leakage gap 31, and the oil in the pressure chamber 15 is compressed. When the oil in the pressure chamber 15 is compressed, the oil pressure in the pressure chamber 15 increases, so that the tensioner reaction force increases relatively rapidly (see the interval between points P1 and P2 in FIG. 6), until at point P2 in FIG. 6, the upward pressure applied to the plunger 28 from the oil in the pressure chamber 15 becomes equal to the downward biasing force applied to the plunger 28 from the valve spring 37.

<Points P2 to P3>

The rod 14 illustrated in FIG. 2A moves further downwardly. At this time, since the upward pressure applied to the plunger 28 from the oil in the pressure chamber 15 exceeds the downward biasing force applied to the plunger 28 from the valve spring 37, the plunger 28 moves upwardly. During this period, the pressure in the pressure chamber 15 increases more slowly due to the upward movement of the plunger 28, so that the tensioner reaction force is kept substantially uniform (see the interval between points P2 and P3 in FIG. 6). Namely, since the plunger 28 moves upwardly as the rod 14 moves downwardly, the volume of the pressure chamber 15 hardly changes, so that the pressure in the pressure chamber 15 is kept substantially uniform. At this time, since the volume of the pressure chamber 15 hardly changes, oil hardly flows through the first and second leakage gaps 31 and 32. Then, at point P3 in FIG. 6, as illustrated in FIG. 2B, the seat surface 35*b* is seated on the valve seat 35*a*, so that the plunger 28 stops moving upwardly.

<Points P3 to P4>

The rod 14 illustrated in FIG. 2B moves further downwardly. As this time, since the seat surface 35*b* is seated on the valve seat 35*a* as illustrated in FIG. 2B, the plunger 28 also moves downwardly together with the rod 14. When the plunger 28 and the rod 14 move downwardly together, the oil in the pressure chamber 15 is further compressed, so that the oil pressure in the pressure chamber 15 increases again, and thus the tensioner reaction force increases rapidly again (see the interval between points P3 and P4 in FIG. 6). At this time, since the seat surface 35*b* is seated on the valve seat 35*a* as illustrated in FIG. 2B, no oil in the pressure chamber 15 flows through the first leakage gap 31, whereas some oil in the pressure chamber 15 flows through, and out of, the second leakage gap 32.

<Points P4 to P5>

The rod 14 illustrated in FIG. 2B starts to move upwardly. At this time, since the upward pressure applied to the plunger 28 from the oil in the pressure chamber 15 exceeds the downward biasing force applied to the plunger 28 from the valve spring 37, the plunger 28 also moves upwardly together with the rod 14. When the plunger 28 and the rod 14 move upwardly together, the compression of the oil in the pressure chamber 15 is gradually released, so that the oil pressure in the pressure chamber 15 decreases, and thus the tensioner reaction force decreases relatively rapidly (see the interval between points P4 and P5 in FIG. 6). At this time, due to the released compression (i.e., the expansion) of the oil in the pressure chamber 15, the volume of the oil in the pressure chamber 15 increases, so that oil hardly flows through the second leakage gap 32. Also, since the seat surface 35*b* is seated on the valve seat 35*a* as illustrated in FIG. 2B, no oil flows through the first leakage gap 31, either. Then, at point P5 in FIG. 6, the upward pressure applied to the plunger 28 from the oil in the pressure chamber 15 becomes equal to the downward biasing force applied to the plunger 28 from the valve spring 37.

<Points P5 to P6>

The rod 14 illustrated in FIG. 2B moves further upwardly. At this time, the upward pressure applied to the plunger 28 from the oil in the pressure chamber 15 falls below the downward biasing force applied to the plunger 28 from the valve spring 37, so that the plunger 28 moves downwardly. During this period, the pressure in the pressure chamber 15 decreases more slowly due to the downward movement of the plunger 28, so that the tensioner reaction force is kept substantially uniform (see the interval between points P5 and P6 in FIG. 6). Namely, since the plunger 28 moves downwardly as the rod 14 moves upwardly, the volume of the pressure chamber 15 hardly changes, so that the pressure in the pressure chamber 15 is kept substantially uniform. At this time, as in the interval between points P2 and P3, since the volume of the pressure chamber 15 hardly changes, oil hardly flows through the first and second leakage gaps 31 and 32. Then, at point P6 in FIG. 6, as illustrated in FIG. 2A, the downward movement of the plunger 28 is prevented by the stopper 34, so that the plunger 28 stops moving downwardly.

<Points P6 to P7>

The rod 14 illustrated in FIG. 2A moves further upwardly. At this time, since the downward movement of the plunger 28 relative to the rod 14 is prevented by the stopper 34 as illustrated in FIG. 2A, the plunger 28 also moves upwardly together with the rod 14. When the plunger 28 and the rod 14 move upwardly together, the compression of the oil in the pressure chamber 15 is further released, so that the oil pressure in the pressure chamber 15 starts to decrease again, and thus the tensioner reaction force decreases rapidly again (see the interval between points P6 and P7 in FIG. 6). At this time, as in the interval between points P4 and P5, due to the released compression (i.e., the expansion) of the oil in the pressure chamber 15, the volume of the oil in the pressure chamber 15 increases, so that oil hardly flows through the first and second leakage gaps 31 and 32. The oil pressure in the pressure chamber 15 illustrated in FIG. 1 decreases until, at point P7 in FIG. 6, this oil pressure becomes equal to the oil pressure in the reservoir chamber 24, so that the compression of the oil in the pressure chamber 15 is completely released.

<Points P7 to P1>

The rod 14 illustrated in FIG. 1 moves further upwardly. At this time, since the downward movement of the plunger 28 relative to the rod 14 is prevented by the stopper 34, the plunger 28 also moves upwardly together with the rod 14. When the plunger 28 and the rod 14 move upwardly together, the oil pressure in the pressure chamber 15 falls below the oil pressure in the reservoir chamber 24, so that the first check valve 27 is opened, and oil flows from the reservoir chamber 24 into the pressure chamber 15 through the oil passages 25. Therefore, the oil pressure in the pressure chamber 15 hardly changes, so that the tensioner reaction force is kept substantially uniform (see the interval between points P7 and P1 in FIG. 6).

As described above, while the tensioner of the actual embodiment is being contracted, when the tensioner reaction force reaches a predetermined value (value at point P2 in FIG. 6), the plunger 28 begins to move upwardly so as to absorb any change in the volume of the pressure chamber 15, so that while the plunger 28 is moving upward, the tensioner reaction force is kept substantially uniform (see the interval between points P2 and P3 in FIG. 6). Therefore, the tensioner of the actual embodiment shows reaction force characteristics in which while the tensioner is being contracted, the rate at which the tensioner reaction force is increasing changes first from high to low at point P2, and then changes from low to high at point P3.

Also, while the tensioner of the actual embodiment is being extended, when the tensioner reaction force reaches a predetermined value (value at point P5 in FIG. 6), the plunger 28 begins to move downwardly so as to absorb any change in the volume of the pressure chamber 15, so that while the plunger 28 is moving downward, the tensioner reaction force is kept substantially uniform (see the interval between points P5 and P6 in FIG. 6). Therefore, the tensioner of the actual embodiment shows reaction force characteristics in which while the tensioner of the actual embodiment is being extended, the rate at which the tensioner reaction force is decreasing changes first from high to low at point P5, and then from low to high at point P6.

Since the tensioner of the actual embodiment shows such reaction force characteristics, while the engine is running normally, it is possible to keep the tensioner reaction force small, and thus to keep small the tension applied to the belt 54 by the tension pulley 55 illustrated in FIG. 7A, whereas when the engine is started by driving the starter generator 52, it is possible to generate a large tensioner reaction force, and thus to effectively prevent the slippage between the belt 54 and the pulley $P_2$ illustrated in FIG. 7B.

Namely, while the engine is running normally, as illustrated by symbol S1 in FIG. 6, the tensioner of the actual embodiment is displaced at an amplitude smaller than ±0.5 mm (e.g., amplitude of about ±0.1 mm to ±0.2 mm). Thus, while the tensioner of the actual embodiment is being contracted, its tensioner reaction force increases from initial point P1 to point P2, and further increases from point P2 up to a point between points P2 and P3. When the tensioner of the actual embodiment is extended thereafter, the tensioner reaction force decreases from the above point between points P2 and P3 to a point between points P5 and P6, and further decreases from this point to point P6, then to point P6, and then to point P1. In this way, by using the tensioner of the actual embodiment, while the engine is running normally, the maximum value of the tensioner reaction force can be limited to a value corresponding to a point between points P2 and P3, so that it is possible to keep small the tension applied to the belt 54 by the tension pulley 55 illustrated in FIG. 7A, and thus to reduce the fuel consumption of the engine.

On the other hand, when the engine is started by driving the starter generator 52, as illustrated by symbol S2 in FIG. 6, the tensioner of the actual embodiment is contracted up to the maximum value of amplitude ±0.5 mm or a value close to the maximum value thereof. At this time, the tensioner reaction force of the embodying tensioner increases up to, or close to, point P4. Therefore, when the engine is started by driving the starter generator 52, it is possible to generate a large tensioner reaction force, and thus to effectively prevent the slippage between the belt 54 and the pulley P2 illustrated in FIG. 7B.

In contrast thereto, if the conventional tensioner is used, while the engine is running normally, the tension of the belt 54 tends to be too large. Namely, when the conventional tensioner is displaced at the amplitude indicated by symbol S1 in FIG. 6, while the conventional tensioner is being contracted, its tensioner reaction force increases from initial point Q1 up to a point between points Q1 and Q2. When the conventional tensioner is extended thereafter, the tensioner reaction force decreases from the above point between points Q1 and Q2 to a point between points Q3 and Q1, and further decreases to point Q1. In this way, if the conventional tensioner is used, while the engine is running normally, the maximum value of the tensioner reaction force increases up to a point between points Q1 and Q2, so that the tension applied to the belt 54 by the tension pulley 55 illustrated in FIG. 7A tends to be too large, thus making it difficult to reduce the fuel consumption of the engine.

Also, if the conventional tensioner is used, when the engine is started by driving the starter generator 52, it is difficult to generate a large tensioner reaction force. Namely, when, as illustrated by symbol S2 in FIG. 6, the conventional tensioner is contracted up to the maximum value of amplitude ±0.5 mm or a value close to the maximum value thereof, the tensioner reaction force increases only up to, or close to, point Q2. Therefore, when the engine is started by driving the starter generator 52, it is difficult to generate a large tensioner reaction force, so that slippage is likely to occur between the belt 54 and the pulley $P_2$ illustrated in FIG. 7B.

DESCRIPTION OF REFERENCE NUMERALS

10: cylinder
13: valve sleeve
14: rod
15: pressure chamber
16: spring seat
17: return spring
24: reservoir chamber
25: oil passage
27: first check valve
28: plunger
31: first leakage gap
32: second leakage gap
34: stopper
35: second check valve
35*a*: valve seat
35*b*: seat surface
37: valve spring

The invention claimed is:

1. A hydraulic auto-tensioner comprising:
   a cylinder having a bottom, and containing oil in the cylinder;
   a valve sleeve standing on a bottom surface of the cylinder;
   a rod having a lower end portion slidably inserted in the valve sleeve such that a pressure chamber is defined in the valve sleeve;
   a spring seat provided on an upper portion of the rod;
   a return spring mounted between the spring seat and the bottom surface of the cylinder, and biasing the cylinder and the spring seat in a direction away from each other,
   a reservoir chamber being defined between an inner periphery of the cylinder and an outer periphery of the valve sleeve, and
   an oil passage being formed such that a lower portion of the pressure chamber communicates with a lower portion of the reservoir chamber through the oil passage,
   a first check valve in a bottom end of the valve sleeve, the first check valve being configured such that when pressure in the pressure chamber exceeds pressure in the reservoir chamber, the first check valve is closed so as to block communication between the pressure chamber and the oil passage;
   wherein the hydraulic auto-tensioner is configured such that when a pushing force is applied to the rod through the spring seat, the first check valve is closed so that oil in the pressure chamber leaks from the pressure chamber into the reservoir chamber, and a hydraulic damper force generated by the oil leaking from the pressure chamber dampens the pushing force applied to the rod,
   wherein the hydraulic auto-tensioner further comprises:
      a tubular plunger fitted on an outer diameter surface of the rod, wherein a first leakage gap is defined between sliding surfaces of the plunger and the rod, the tubular plunger being slidable along the outer diameter surface of the rod and the an inner diameter surface the valve sleeve,
   a second leakage gap being defined between sliding surfaces of the plunger and the valve sleeve such that resistance to oil flowing in the second leakage gap is larger than resistance to oil flowing in the first leakage gap,
   wherein the hydraulic auto-tensioner further comprises:
      a second check valve between the rod and the plunger, the second check valve being configured to close the first leakage gap when the plunger moves upwardly as the pressure in the pressure chamber increases;
      a stopper provided at a bottom end of the rod to prevent separation of the plunger; and
      a valve spring biasing the plunger toward the stopper.

2. The hydraulic auto-tensioner according to claim 1, wherein the rod includes, at the upper portion of the rod, a large diameter shaft portion extending from near a top end of the plunger toward an outside of the plunger, and
   wherein the second check valve comprises:

a valve seat having a spherical surface, the valve seat being located at a bottom end of the large diameter shaft portion of the rod; and a seat surface provided on an upper portion of an inner diameter surface of the plunger, the seat surface being capable of being seated on the valve seat.

3. The hydraulic auto-tensioner according to claim 2, wherein the valve seat of the rod and the seat surface of the plunger are subjected to surface hardening treatment.

4. The hydraulic auto-tensioner according to claim 3, wherein the surface hardening treatment comprises one of diamond-like carbon treatment, hard film forming coating treatment, shot peening, and WPC treatment.

5. The hydraulic auto-tensioner according to claim 1, wherein the valve spring is selected from a group consisting of a coil spring, a plurality of disk springs, a plurality of wave washers, and a wave spring.

* * * * *